US012644403B2

(12) United States Patent
Choi et al.

(10) Patent No.: US 12,644,403 B2
(45) Date of Patent: Jun. 2, 2026

(54) METHOD FOR REDUCING EMISSIONS FROM A HYDROGEN COMBUSTION ENGINE

(71) Applicants: HYUNDAI MOTOR COMPANY, Seoul (KR); KIA CORPORATION, Seoul (KR)

(72) Inventors: Sung Mu Choi, Hwaseong-si (KR); Ji Ho Cho, Hwaseong-si (KR); Hyung Jun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/072,610

(22) Filed: Mar. 6, 2025

(65) Prior Publication Data

US 2026/0104003 A1 Apr. 16, 2026

(30) Foreign Application Priority Data

Oct. 15, 2024 (KR) ........................ 10-2024-0140638

(51) Int. Cl.

*F01N 3/20* (2006.01)
*F02B 43/10* (2006.01)
*F02D 19/06* (2006.01)
*F02D 41/14* (2006.01)

(52) U.S. Cl.

CPC ............. *F01N 3/206* (2013.01); *F01N 3/208* (2013.01); *F01N 3/2066* (2013.01); *F01N 2430/04* (2013.01); *F01N 2560/028* (2013.01); *F01N 2610/02* (2013.01); *F01N 2900/04* (2013.01); *F02B 2043/106* (2013.01); *F02D 19/0644* (2013.01); *F02D 2041/1472* (2013.01)

(58) Field of Classification Search

CPC combination set(s) only.
See application file for complete search history.

(56) References Cited

U.S. PATENT DOCUMENTS

| | | | | |
|---|---|---|---|---|
| 6,122,909 | A * | 9/2000 | Murphy | F01N 3/2046 60/275 |
| 6,508,209 | B1 * | 1/2003 | Collier, Jr. | F02D 19/0671 123/3 |
| 12,215,614 | B2 | 2/2025 | Gaiser | |

(Continued)

FOREIGN PATENT DOCUMENTS

| | | | | |
|---|---|---|---|---|
| JP | 2016070244 A * | 5/2016 | | G02B 21/14 |
| KR | 20240022424 A | 2/2024 | | |

*Primary Examiner* — Binh Q Tran

(74) *Attorney, Agent, or Firm* — Lempia Summerfield Katz LLC

(57) ABSTRACT

A method for reducing emissions from a hydrogen combustion engine includes: a first step in which a controller obtains an $H_2O$ concentration at a front end of an SCR catalyst, an SCR temperature, and a $NO_2$/NOx ratio derived from a DOC; a second step in which the controller calculates a predicted NOx purification rate based on the $H_2O$ concentration, the SCR temperature, and the $NO_2$/NOx ratio; and a third step in which the controller calculates a urea dosing amount that aligns with the predicted NOx purification rate and performs control to dose the calculated dosing amount of urea.

9 Claims, 8 Drawing Sheets

(56) References Cited

U.S. PATENT DOCUMENTS

| | | | | |
|---|---|---|---|---|
| 2005/0224042 | A1 * | 10/2005 | Shinagawa | F02M 25/10<br>123/3 |
| 2006/0086080 | A1 * | 4/2006 | Katogi | F01N 9/007<br>60/278 |
| 2006/0248876 | A1 * | 11/2006 | Taxon | B01D 53/9409<br>60/275 |
| 2018/0230879 | A1 * | 8/2018 | Saitoh | F01N 3/208 |
| 2023/0287822 | A1 * | 9/2023 | Sung | F01N 3/101 |
| 2024/0052765 | A1 | 2/2024 | Gaiser | |

* cited by examiner

FIG. 7

| TEMPERATURE | 150 | 175 | 200 | 225 | 250 |
|---|---|---|---|---|---|
| NO2/NOx RATIO | 0 | 0.07 | 0.13 | 0.19 | 0.25 |
| α | 1 | 1.23 | 1.11 | 1.02 | 1 |

METHOD FOR REDUCING EMISSIONS FROM A HYDROGEN COMBUSTION ENGINE

CROSS REFERENCE TO RELATED APPLICATION

This application claims priority to Korean Patent Application No. 10-2024-0140638, filed on Oct. 15, 2024, the entire contents of which are incorporated herein by reference.

BACKGROUND

Field

The present disclosure relates to a method for reducing emissions from a hydrogen engine, which determines a urea dosing amount.

Description of the Related Art

In a commercial diesel engine, to purify NOx through a selective catalytic reduction (SCR) catalyst, it is necessary to obtain a NOx concentration and a temperature of emissions supplied to a front end of the SCR.

To this end, the temperature of the emissions is detected by a temperature sensor mounted on an exhaust line, and a NOx concentration is detected by a NOx sensor.

In addition, an SCR catalyst in a commercial diesel engine typically maintains a relatively constant $H_2O$ concentration of around 10%.

However, in a hydrogen combustion engine, the concentration varies significantly depending on operating conditions of the engine. In particular, excessive $H_2O$ is emitted due to the $H_2+1/2O_2$ reaction, resulting in high concentrations in a range of 15% to 30%.

For the SCR catalyst, $H_2O$ and $NH_3$ adsorption is a competitive reaction, and thus the higher the $H_2O$ concentration, the smaller the amount of $NH_3$ adsorption, resulting in lower NOx purification performance.

However, unlike the diesel engine, the hydrogen combustion engine does not contain CO and HC among the emissions components, and $H_2$ is oxidized at low temperatures in a diesel oxidation catalyst (DOC), and thus the low-temperature oxidation rate of NO ($NO \rightarrow NO_2$) increases, resulting in an increase in a $NO_2$/NOx ratio.

For example, under a high $H_2O$ condition at temperatures below 300° C. (i.e., a low temperature range), the NOx purification performance of the SCR decreases, while the $NO_2$/NOx ratio increases. Therefore, the NOx purification performance due to a high concentration of $H_2O$ may be enhanced.

Therefore, if the $NO_2$/NOx ratio and $H_2O$ concentration are not considered, the NOx purification rate of the SCR catalyst may be inaccurately predicted, leading to excessive or insufficient urea dosing and making it challenging to respond to emissions regulations.

The matters described above as a background art are provided solely to facilitate a better understanding of the background of the present disclosure and should not be construed as an admission that they constitute a related art already known to those having ordinary skill in the art.

SUMMARY

The present disclosure provides a method for reducing NOx emissions from a hydrogen combustion engine by determining a urea dosing amount in consideration of an $H_2O$ concentration and a $NO_2$/NOx ratio.

Technical objectives of the present disclosure are not limited to the technical objectives mentioned above, and other technical objectives not mentioned above should be clearly understood by those having ordinary skill in the art from the following description.

According to an embodiment of the present disclosure, a method for reducing emissions from a hydrogen combustion engine may include: a first step in which a controller obtains an $H_2O$ concentration at a front end of an SCR catalyst, an SCR temperature, and a $NO_2$/NOx ratio derived from a DOC (diesel oxidation catalyst); a second step in which the controller calculates a predicted NOx purification rate based on the $H_2O$ concentration, the SCR temperature, and the $NO_2$/NOx ratio; and a third step in which the controller calculates a urea dosing amount that aligns with the predicted NOx purification rate and performs control to dose the calculated dosing amount of urea.

In the first step, the $H_2O$ concentration at the front end of the SCR catalyst may be calculated based on a value detected by a lambda sensor.

The DOC may be disposed upstream of the SCR catalyst, and the lambda sensor may be disposed between the DOC and the SCR catalyst.

In the first step, the SCR temperature may be detected by a temperature sensor disposed at the front end of the SCR catalyst.

In the first step, the $NO_2$/NOx ratio may be calculated based on an emissions temperature detected at a front end of the DOC.

In the second step, a factor is determined based on a change in a NOx purification rate relative to the $NO_2$/NOx ratio, and the factor may be reflected in the calculation of the predicted NOx purification rate.

When there is no increase in the NOx purification rate based on the $NO_2$/NOx ratio, the factor may be 1. When there is an increase in the NOx purification rate based on the $NO_2$/NOx ratio, the factor may be greater than 1 as follows:

$$\text{Factor}(\alpha) \geq 1$$

In the second step, a NOx concentration may be further reflected in the calculation of the predicted NOx purification rate.

In the second step, a mixture flow rate may be further reflected in the calculation of the predicted NOx purification rate.

The present disclosure predicts the NOx purification rate of the SCR catalyst by using the $H_2O$ concentration, SCR temperature, and $NO_2$/NOx ratio, and determines the urea dosing amount based on the predicted NOx purification rate to inject urea, thereby preventing excessive urea injection.

As a result, additional emissions ($N_2O$, NO, etc.) from $NH_3$ are not generated, thereby enabling improved NOx purification performance and an effective response to emissions regulations.

The effects which may be achieved in the present disclosure are not limited to the effects mentioned above, and other effects not mentioned above should be clearly appreciated from the following description by those having ordinary skill in the art.

BRIEF DESCRIPTION OF THE DRAWINGS

FIG. 7 is a diagram showing an a value depending on the emissions temperature in an embodiment of the present disclosure.

DETAILED DESCRIPTION

Figure 1:
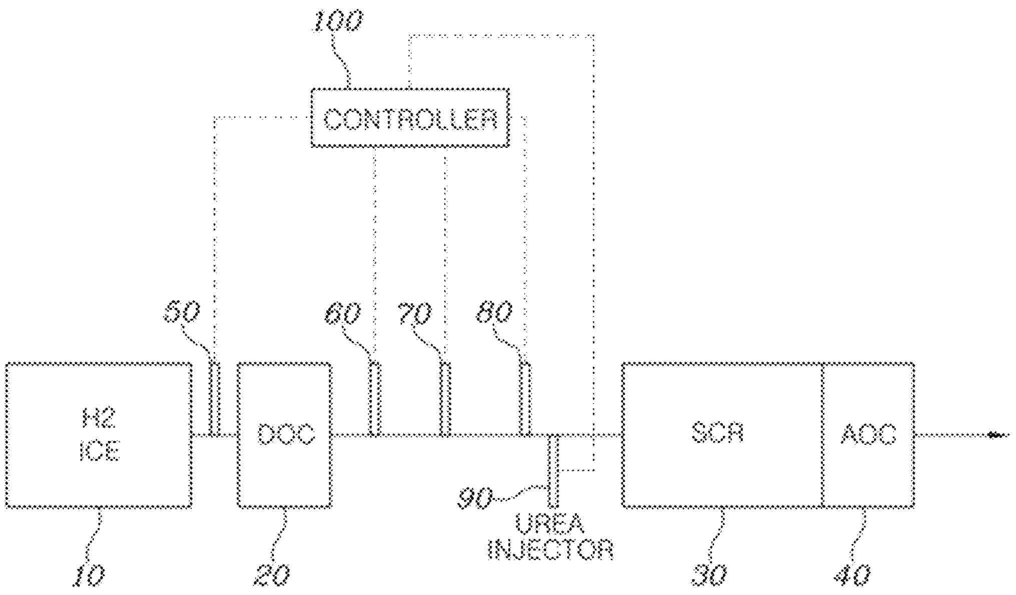
FIG. 1 is a schematic diagram of an exhaust system of an engine powered by hydrogen fuel.

In describing embodiments disclosed herein, when a detailed description of a known related art is determined to obscure the gist of the present specification, the detailed description thereof has been omitted herein. In addition, the accompanying drawings are merely for easy understanding of the embodiments disclosed herein, and the technical spirit disclosed herein is not limited by the accompanying drawings, and it should be understood to include all modifications, equivalents, and substitutes included in the spirit and scope of the present disclosure.

Terms containing ordinal numbers such as first, second, and the like used herein may be used to describe various components, but the components are not limited by these terms. The terms are used only for the purpose of distinguishing one component from another component.

Unless the context clearly dictates otherwise, the singular form includes the plural form.

The terms "comprising," "having," "including" or the like as used herein are used to specify that a feature, a number, a step, an operation, a component, an element, or a combination thereof described herein are present, and they do not preclude the presence or addition of one or more other features, numbers, steps, operations, components, elements, or combinations thereof.

As used in the following description, suffixes "module" and "part" for a component are used or interchangeably used solely for ease of preparation of the specification, and do not have different meanings and each of them does not function by itself.

When a component is referred to as being "connected" or "coupled" to another component, the component may be directly connected or coupled to another component, but it should be understood that still another component may be present between the component and another component. Conversely, when a component is referred to as being "directly connected" or "directly coupled" to another, it should be understood that another component may not be present between the component and another component.

When a component, device, element, or the like of the present disclosure is described as having a purpose or performing an operation, function, or the like, the component, device, or element should be considered herein as being "configured to" meet that purpose or to perform that operation or function.

In addition, a unit or control unit included in names is only a term widely used in the naming of a controller that controls the specific function of a vehicle, but does not mean a generic function unit.

A controller may include a communication device for communicating with other control units or sensors to control a responsible function, a memory for storing an operating system, a logic command, and input/output information, and one or more processors for performing determination, calculation, and decision which are necessary for controlling the responsible function.

Any number of components or a variety of components in any of the configurations described herein may be included in the disclosure described herein. The components may include any combination of the features described herein, and may be arranged in any of the various configurations described herein. The concepts regarding the structure and arrangement of the components of the present disclosure, as well as their use and operation, are not limited to the specific embodiments discussed herein, but may be applied to any number of embodiments in any combination. Embodiments including those having various features of various arrangements are described below with reference to the drawings.

Hereinafter, embodiments disclosed herein are described in detail with reference to the drawings. The same reference numerals are given to the same or similar components regardless of reference numerals, and a repetitive description thereof has been omitted.

FIG. 1 is a schematic diagram of an exhaust system of an engine powered by hydrogen fuel. In the exhaust system, a DOC 20 is disposed upstream of an exhaust line, and an SCR catalyst 30 and an AOC 40 are disposed sequentially downstream of the DOC 20.

For an SCR catalyst 30, a Cu-zeolite SCR catalyst with high purification performance at low-temperature may be applied.

In addition, an upstream temperature sensor 50 may be provided at a front end of the DOC 20 to detect a temperature of emissions entering the DOC 20.

In addition, a lambda sensor 60, a downstream temperature sensor 70, and a NOx sensor 80 may be disposed sequentially between the DOC 20 and the SCR catalyst 30.

In addition, a urea injector 90 may be disposed at the front end of the SCR catalyst 30 to inject urea to the SCR catalyst 30.

Signals sensed by the sensors may be input to a controller 100.

Accordingly, the controller 100 may calculate a urea dosing amount (i.e., an amount of urea to be injected) based on the signals input from the sensors, and may output a signal to operate and control the urea injector 90 to inject the urea.

Figure 2:
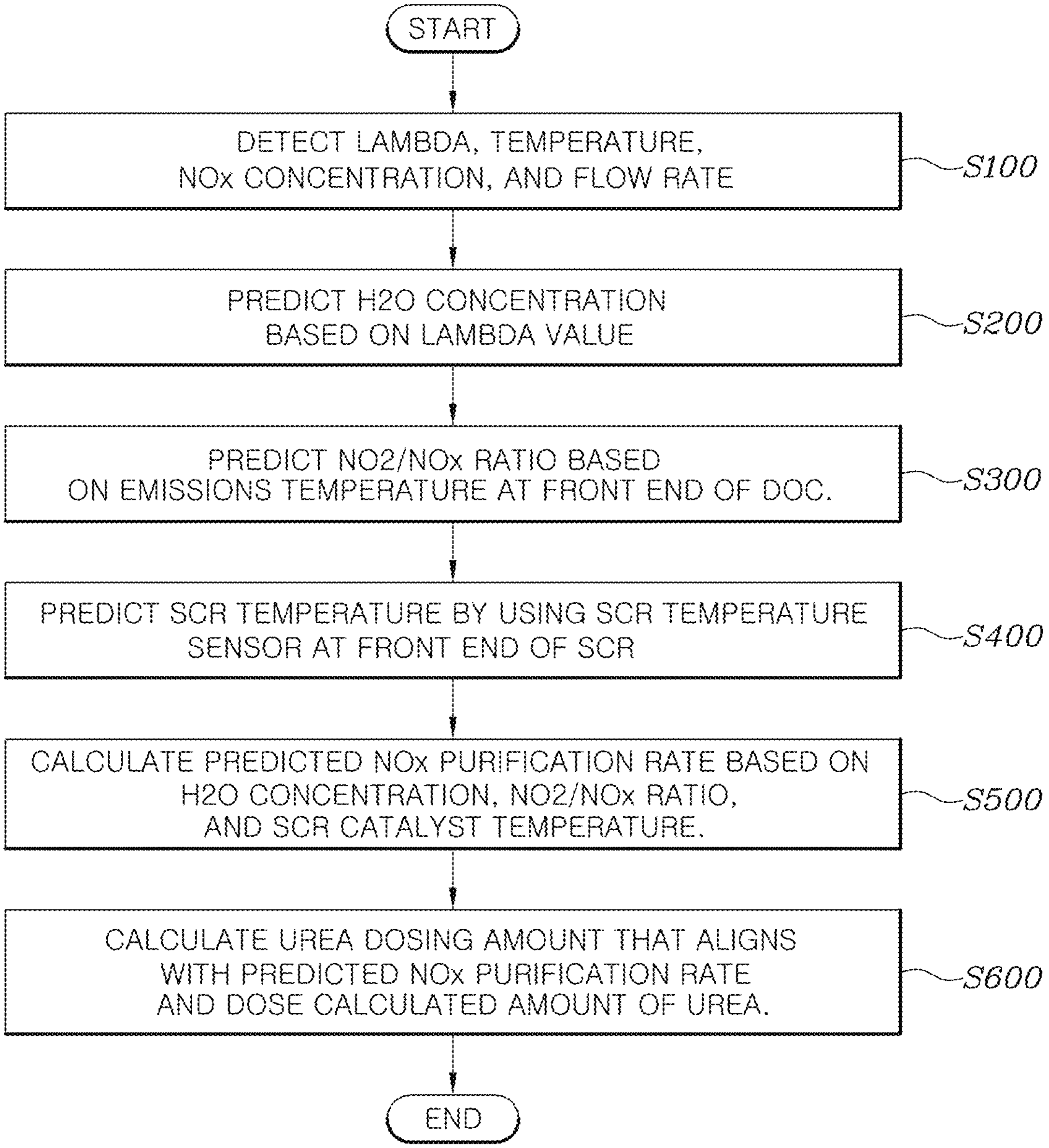
FIG. 2 is a block diagram illustrating a method for reducing emissions for a hydrogen combustion engine according to an embodiment of the present disclosure.

In addition, FIG. 2 is a diagram illustrating a method for reducing emissions from an engine powered by hydrogen fuel according to an embodiment of the present disclosure. The method includes: a first step in which a controller 100 obtains an $H_2O$ concentration at a front end of an SCR catalyst 30, an SCR temperature, and a $NO_2$/NOx ratio derived from a DOC 20; a second step in which the controller 100 calculates a predicted NOx purification rate based on the $H_2O$ concentration, the SCR temperature, and the $NO_2$/NOx ratio; and a third step in which the controller 100 calculates a urea dosing amount that aligns with the predicted NOx purification rate and performs control to dose the calculated dosing amount of urea.

Figure 3:
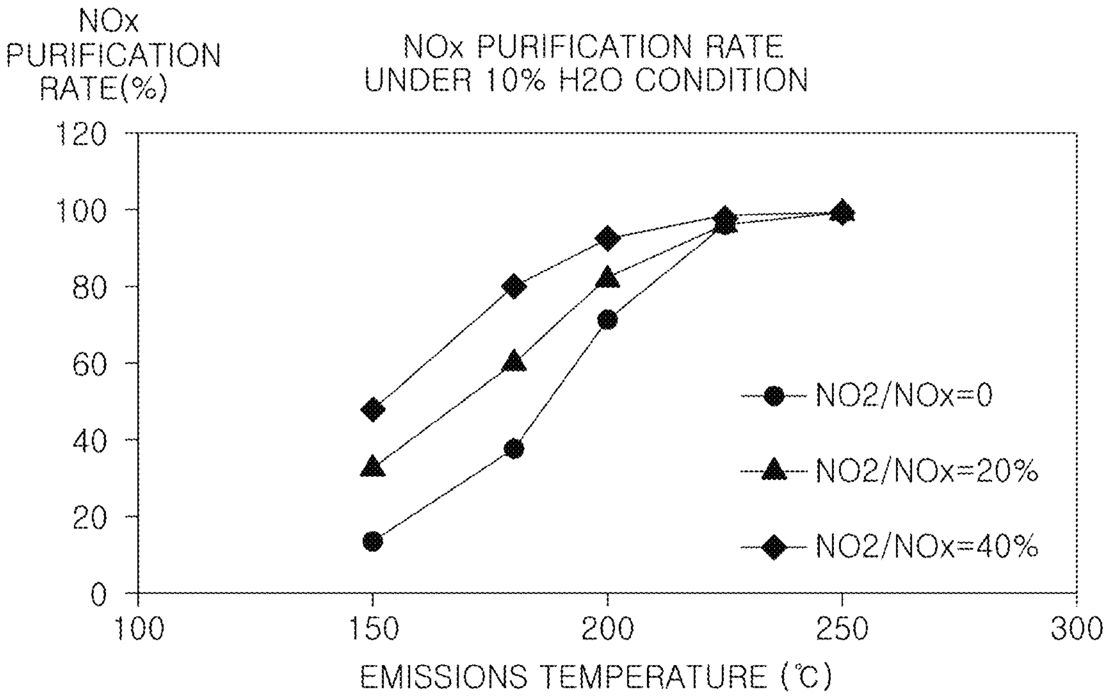
FIG. 3 and FIG. 4 are diagrams showing the relationship between a $NO_2$/NOx ratio and an $H_2O$ concentration and a NOx purification rate in embodiments of the present disclosure.
Figure 4:
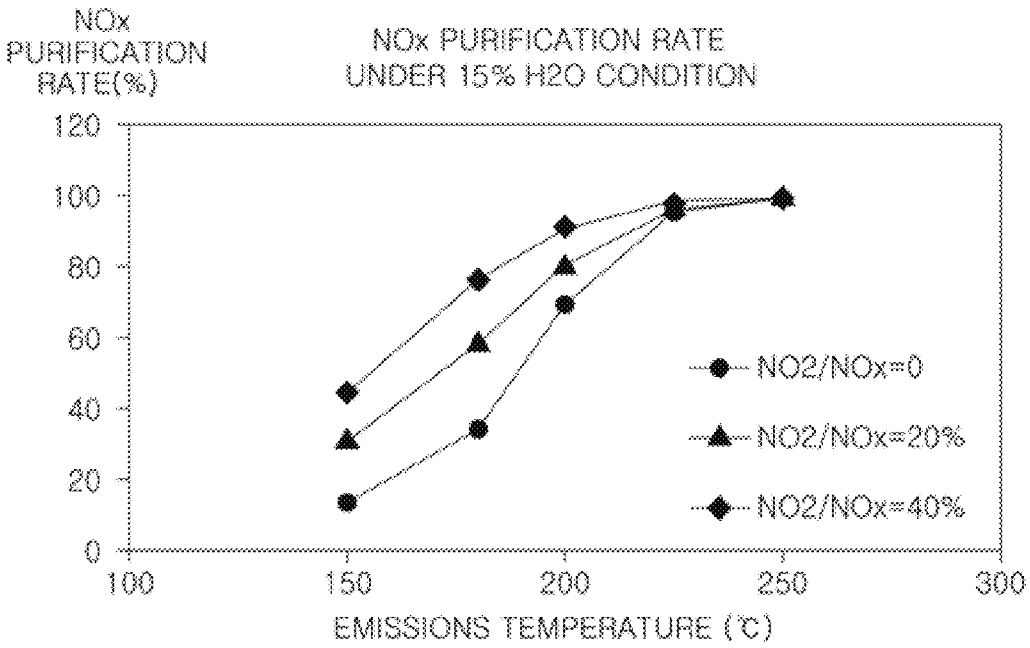

For example, as shown in FIGS. 3 and 4, when the $NO_2$/NOx ratio is relatively low, the NOx purification rate decreases; and when the $NO_2$/NOx ratio is relatively high, the NOx purification rate increases relatively.

In addition, when the $H_2O$ concentration is relatively high, the NOx purification rate decreases; and when the $H_2O$ concentration is relatively low, the NOx purification rate increases relatively.

Therefore, if the $NO_2$/NOx ratio is low and the $H_2O$ concentration is high, failing to consider these conditions may lead to an overprediction of the NOx purification rate of the SCR catalyst 30, and excessive urea is injected to the SCR catalyst to align with the overpredicted NOx purification rate.

Then, NH3 that has not reacted with NOx is converted to N2O and NO in the AOC 40, and thus unnecessary emissions increase, thereby making it challenging to comply with emissions regulations.

Therefore, in the present disclosure, the NOx purification performance of the SCR catalyst 30 is determined as a function of a temperature of the SCR catalyst 30, an $H_2O$ concentration, and a $NO_2$/NOx ratio, and thus the NOx purification rate of the SCR catalyst 30 is predicted by using the $H_2O$ concentration, the SCR temperature, and the $NO_2$/NOx ratio.

Therefore, it is possible to effectively address NOx and $N_2O$ regulations by determining the urea dosing amount based on the predicted NOx purification rate and injecting urea.

In an embodiment, in the first step, an $H_2O$ concentration at the front end of the SCR catalyst 30 may be calculated based on a value detected by the lambda sensor 60.

The DOC 20 may be disposed upstream of the SCR catalyst 30, and the lambda sensor 60 may be disposed between the DOC 20 and the SCR catalyst 30.

Figure 5:
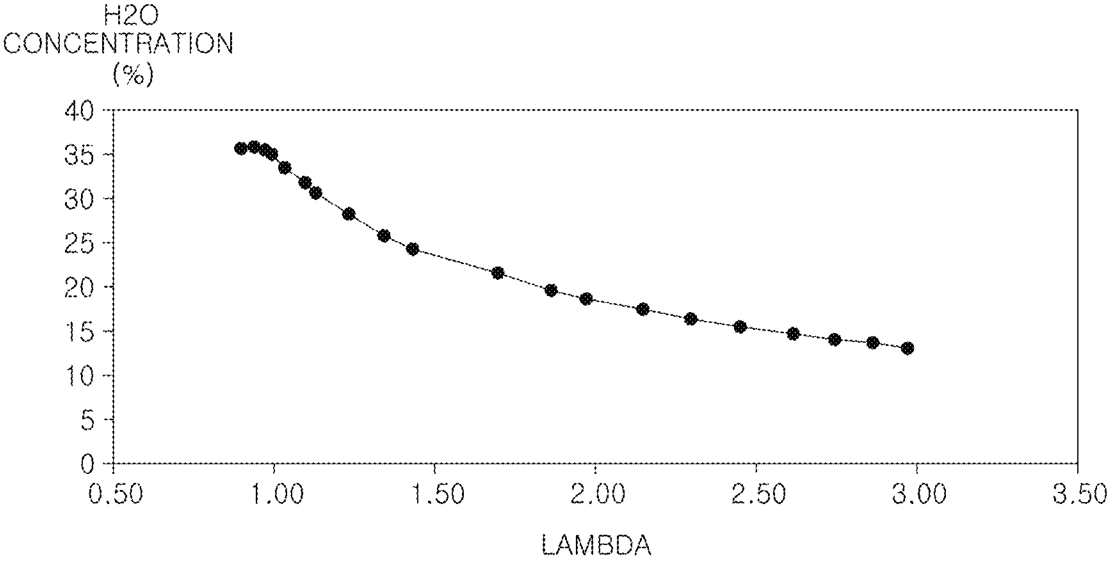
FIG. 5 is a diagram showing the relationship between a lambda value and an $H_2O$ concentration in an embodiment of the present disclosure.

FIG. 5 is a diagram showing the relationship between a lambda value and an $H_2O$ concentration of a hydrogen combustion engine 10. According to the diagram, when the lambda value is detected by the lambda sensor 60, the $H_2O$ concentration may be determined based on the lambda value.

For example, when lambda=1.43, the $H_2O$ concentration may be determined to be 25%.

In addition, in an embodiment, the SCR temperature may be detected by the downstream temperature sensor 70 disposed at the front end of the SCR catalyst 30.

In addition, the $NO_2$/NOx ratio may be calculated based on the emissions temperature detected at the front end of the DOC 20. In other words, the $NO_2$/NOx ratio may be determined as a function of the detected emissions temperature.

The emissions temperature detected at the front end of the DOC 20 may be detected by the upstream temperature sensor 50 disposed at the front end of the DOC 20.

Figure 6:
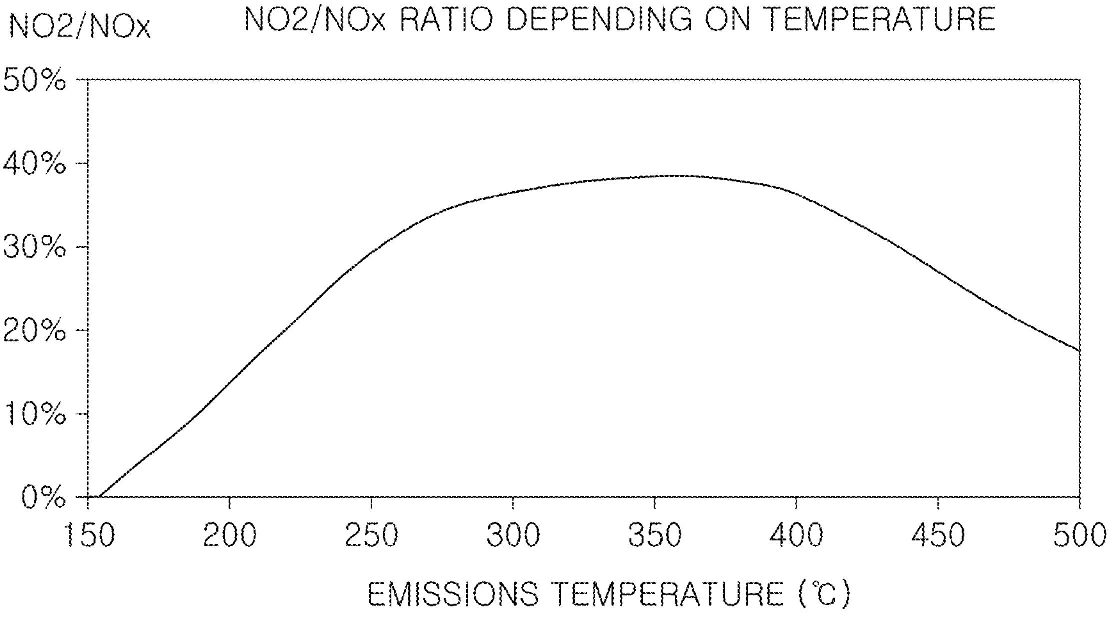
FIG. 6 is a diagram showing a $NO_2$/NOx ratio depending on the emissions temperature in an embodiment of the present disclosure.

FIG. 6 is a diagram showing a $NO_2$/NOx ratio depending on the emissions temperature. As the emissions temperature increases, some of the NO is converted to $NO_2$.

For example, at emissions temperature in a range of 150° C. to 300° C., the $NO_2$/NOx ratio is represented by the relationship $NO_2$/NOx ratio=0.0029*x−0.4402, and the $NO_2$/NOx ratio may be calculated based on the relationship. (x=emissions temperature)

In addition, the present disclosure may obtain a factor representing the influence of the $NO_2$/NOx ratio on a NOx purification rate and reflect the factor in the calculation of a predicted NOx purification rate in the second step. In other words, the factor is determined based on changes (e.g., increase or decrease) in the NOx purification rate relative to the $NO_2$/NOx ratio.

When there is no increase in the NOx purification rate based on the $NO_2$/NOx ratio, the factor may be 1, and when there is an increase in the NOx purification rate based on the $NO_2$/NOx ratio, the factor may be greater than 1 as follows:

$$\text{Factor}(\alpha)\geq 1.$$

To be more specific, the predicted NOx purification rate may be determined as a function of f (the catalyst temperature, $H_2O$ concentration, $NO_2$/NOx ratio, NOx concentration, and flow rate), which may be organized as follows:

$$\text{Predicted NOx purification rate}=f(\text{catalyst temperature, } H_2O \text{ concentration, NOx concentration, flow rate})*\alpha.$$

In the equation above, when the $NO_2$/NOx ratio increases, the factor by which the NOx purification rate increases compared to $NO_2$/NOx=0 is defined as α.

Referring to FIG. 7, at an emissions temperature of 150° C., the $NO_2$/NOx ratio is 0, so α=1; and at 250° C., the $NO_2$/NOx ratio is 0.25, but there is no improvement in the NOx purification rate, so α=1.

In other words, at 150° C., $NO_2$/NOx=0, so there is no increase in the NOx purification rate; and at 250° C., $NO_2$/NOx increases, but there is no improvement in the NOx purification rate due to the high temperature.

However, at an emissions temperature of 200° C., the $NO_2$/NOx ratio is 0.13, which is 1.11 times higher than the NOx purification rate when $NO_2$/NOx=0, so α=1.11.

As such, in the range of 150 to 250° C., the $NO_2$/NOx ratio increases, leading to an improvement in the NOx purification rate, so α>1.

In addition, in the second step, the NOx concentration may be further reflected in the calculation of the predicted NOx purification rate.

For example, the NOx concentration may be detected by the NOx sensor 80 disposed at the front end of the SCR catalyst 30.

In addition, in the second step, a mixture flow rate may be further reflected in the calculation of the predicted NOx purification rate.

For example, the mixture flow rate, which is a combined flow rate of air and fuel, may be obtained through an EMS.

A process for reducing emissions according to an embodiment of the present disclosure is described below.

While a vehicle is driving, signals detected by the lambda sensor 60, the upstream temperature sensor 50, the downstream temperature sensor 70, the NOx sensor 80, and the like are input to the controller 100 (in a step or operation S100).

Accordingly, a concentration of $H_2O$ in the emissions derived from the DOC 20 is calculated based on a lambda value detected through the lambda sensor 60 (in a step or operation S200).

In addition, a $NO_2$/NOx ratio is calculated by using an emissions temperature detected through the upstream temperature sensor 50 (in a step or operation S300).

In addition, an SCR temperature is calculated by using an emissions temperature detected through the downstream temperature sensor 70 (in a step or operation S400).

Subsequently, in a step or operation S500, a NOx purification rate is predicted by using the $H_2O$ concentration, the $NO_2$/NOx ratio, and the SCR temperature obtained in the steps or operations S200, S300, and S400.

Then, a urea dosing amount that aligns with the predicted NOx purification rate is calculated, and urea is dosed by the calculated dosing amount to remove NOx (in a step or operation S600).

Figure 8:
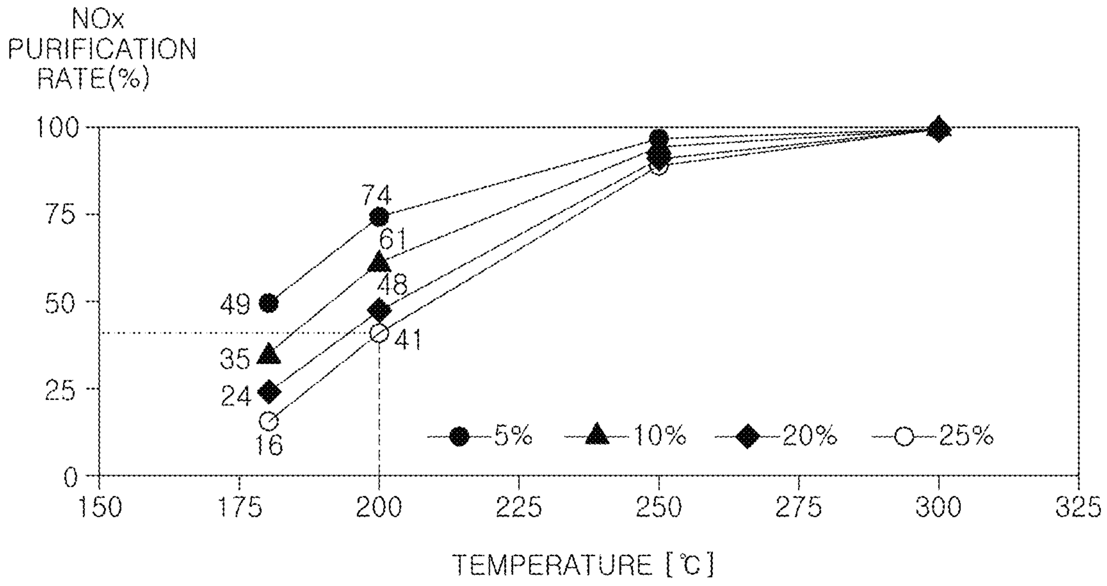
FIG. 8 is a diagram showing the relationship between an emissions temperature and $H_2O$ concentration and a NOx purification rate in an embodiment of the present disclosure.

For example, when 1 mol of NO is supplied to the SCR catalyst 30 based on the reaction 4NH3+4NO+O2→4N2+6 $H_2O$, the NOx purification rate is only 40% at 200° C. under a 25% $H_2O$ concentration, as shown in FIG. 8. Accordingly, urea is dosed to supply 0.4 mol of NH3.

Therefore, since urea is not used excessively, additional emissions (N2O, NO, etc.) from NH3 are not generated, thereby enabling an effective response to emissions regulations.

Furthermore, as the emissions temperature increases, the oxidation rate of NO to $NO_2$ in the DOC 20 increases, resulting in an increase in the $NO_2$/NOx ratio, thereby increasing NOx purification performance.

However, when the present disclosure is not applied, and a temperature of 200° C. under a 10% $H_2O$ concentration is assumed, it is determined that 61% NOx purification is achievable. Accordingly, 0.61 mol of NH3 is supplied, resulting in an excessive supply of NH3.

Thus, the unreacted 0.21 mol of NH3 is released as is and oxidized in the AOC 40, but if complete oxidization does not occur, additional N2O and NO are generated, thereby reducing emissions purification performance.

As described above, the present disclosure predicts the NOx purification rate of the SCR catalyst 30 by using the $H_2O$ concentration, SCR temperature, and $NO_2$/NOx ratio, determines the urea dosing amount based on the predicted NOx purification rate, and then injects urea, thereby preventing excessive urea injection.

As a result, additional emissions (N2O, NO, etc.) from $NH_3$ are not generated, thereby enhancing NOx purification performance and enabling an effective response to emissions regulations.

Although the specific embodiments of the present disclosure have been illustrated and described, those having ordinary skill in the art should appreciate that various modifications and changes to the present disclosure may be made without departing from the technical spirit of the present disclosure provided in the following claims.

What is claimed is:

1. A method for reducing emissions from a hydrogen combustion engine, the method comprising:

a first step in which a controller obtains an $H_2O$ concentration at a front end of a selective catalytic reduction (SCR) catalyst, an SCR temperature, and a $NO_2$/NOx ratio derived from a diesel oxidation catalyst (DOC);

a second step in which the controller calculates a predicted NOx purification rate based on the $H_2O$ concentration, the SCR temperature, and the $NO_2$/NOx ratio; and a third step in which the controller calculates a urea dosing amount that aligns with the predicted NOx purification rate and performs control to dose the calculated dosing amount of urea.

2. The method of claim 1, wherein in the first step, the $H_2O$ concentration at the front end of the SCR catalyst is calculated based on a value detected by a lambda sensor.

3. The method of claim 2, wherein the DOC is disposed upstream of the SCR catalyst, and the lambda sensor is disposed between the DOC and the SCR catalyst.

4. The method of claim 1, wherein in the first step, the SCR temperature is detected by a temperature sensor disposed at the front end of the SCR catalyst.

5. The method of claim 1, wherein in the first step, the $NO_2$/NOx ratio is calculated based on an emissions temperature detected at a front end of the DOC.

6. The method of claim 1, wherein in the second step, a factor is determined based on a change in a NOx purification rate relative to the $NO_2$/NOx ratio, and the factor is reflected in the calculation of the predicted NOx purification rate.

7. The method of claim 6, wherein:

when there is no increase in the NOx purification rate based on the $NO_2$/NOx ratio, the factor is 1, and when there is an increase in the NOx purification rate based on the $NO_2$/NOx ratio, the factor is greater than 1.

8. The method of claim 1, wherein in the second step, a NOx concentration is further reflected in the calculation of the predicted NOx purification rate.

9. The method of claim 1, wherein in the second step, a mixture flow rate is further reflected in the calculation of the predicted NOx purification rate.

* * * * *